UNITED STATES PATENT OFFICE.

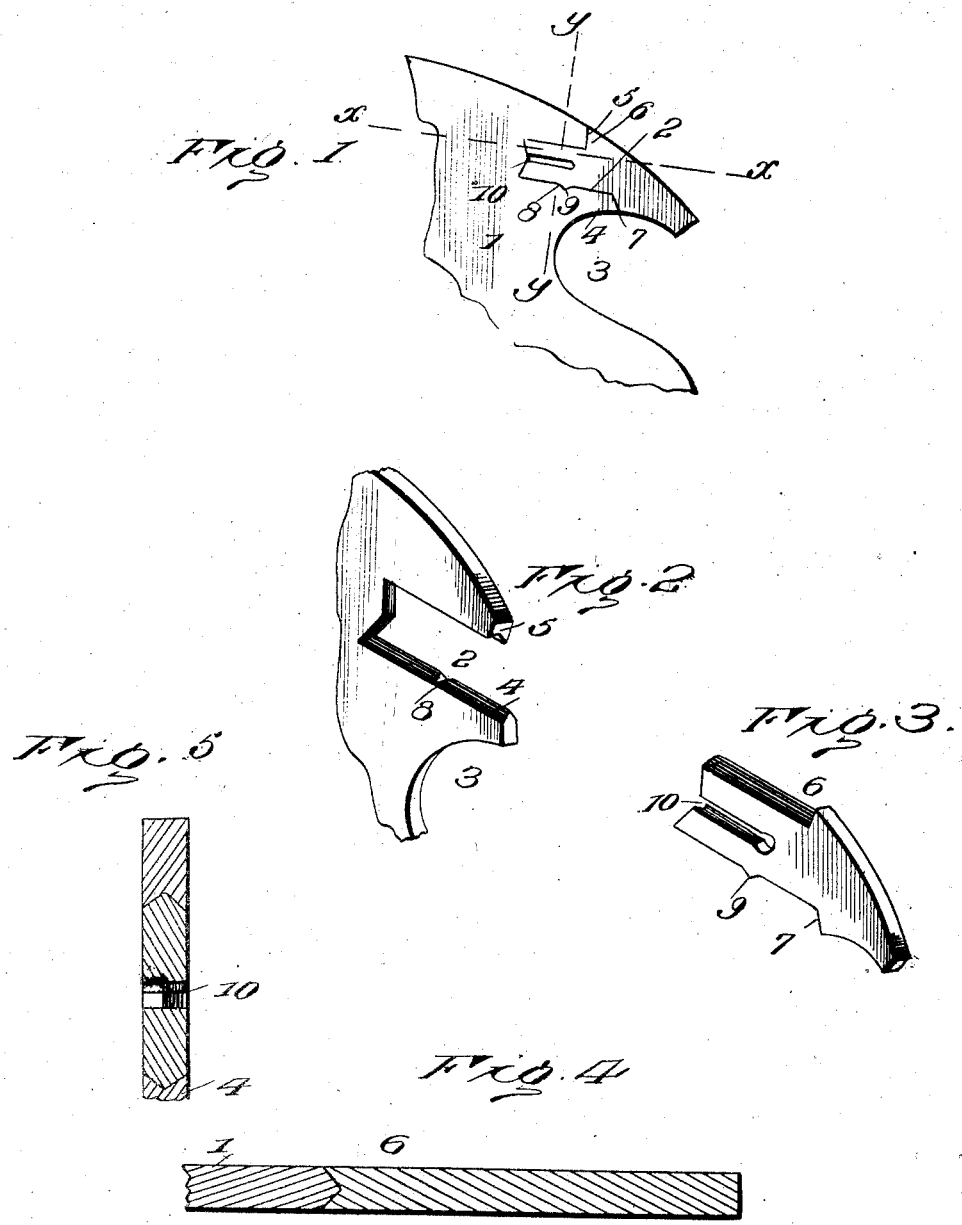

WILLIAM H. ASKINS, OF GARRISON, TEXAS.

INSERTIBLE SAW-TOOTH.

No. 883,076.  Specification of Letters Patent.  Patented March 24, 1908.

Application filed March 2, 1907. Serial No. 360,286.

*To all whom it may concern:*

Be it known that I, WILLIAM H. ASKINS, citizen of the United States, residing at Garrison, in the county of Nacogdoches and State of Texas, have invented certain new and useful Improvements in Insertible Saw-Teeth, of which the following is a specification.

This invention aims to obviate the use of holders for securing inserted teeth in saws and like cutters, thereby cheapening the construction as well as materially increasing the efficiency of the cutter both as to durability and amount of work capable of being actually performed.

For a full description of the invention and the merits thereof and also to acquire a knowledge of the details of construction and means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a portion of a circular saw provided with inserted teeth embodying the invention. Fig. 2 is a perspective view of a portion of the saw showing more clearly the notch or opening adapted to receive the shank of the tooth. Fig. 3 is a perspective view of the tooth. Fig. 4 is a section on the line $x$—$x$ of Fig. 1, showing the parts on a larger scale. Fig. 5 is a section on the line $y$—$y$ of Fig. 1 showing the parts on a larger scale.

Corresponding and like parts are referred to in the following description and indicated in all the views of the drawings by the same reference characters.

The saw blade 1 is provided with notches 2 and 3, the latter constituting throats to provide clearance for the sawdust or cuttings resulting from the action of the saw when in operation. The notches 2 are adapted to receive the shanks of the teeth. The notches 2 and 3 are provided in pairs and are closely related. The tongue 4 separating the notches 2 and 3 does not project to the circumference of the saw and its outer end forms an abutment for the tooth to obtain a purchase against. The notch 2 has a tangential arrangement and its inner end is oppositely inclined. The point which would naturally be provided at the intersection of the outer edge of the notch with the periphery of the blade is cut away to form a square end 5 against which a shoulder 6 obtains a bearing. The tooth has another shoulder 7 which bears against the outer end of the tongue 4. The inner end of the notch 2 is oppositely inclined. The edges of the blade bordering upon the notch 2 are oppositely inclined presenting a V-form in transverse section. This arrangement provides an interlocking joint between the saw blade and tooth to prevent lateral displacement of the latter. A depression 8 is formed in an edge of the notch 2 to receive a projection 9 of the saw tooth shank to retain the latter in place.

The tooth 6 is pointed and may be swaged and is provided with a shank, the latter having a slit 10 to form a spring member to admit of compressing the shank when forcing the same home into the notch 2 and causing said shank to spread when the projection 9 registers with the depression 8 to cause said projection to enter the depression and form interlocking means between the tooth and saw blade to retain the tooth in place against longitudinal displacement. The shoulders 6 and 7 are formed at the base of the shank and are adapted to abut against the square ends provided at the outer end or entrance of the notch 2 as hereinbefore stated. The edge of the shank is formed with a V-shaped groove corresponding to the V form of the edge of the saw blade bordering upon the notch 2, whereby the abutting edges of the shank and notch interlock to prevent lateral displacement of the tooth. The outer ends of the members of the shank bordering upon the slit 10 are oppositely inclined to match the oppositely inclined inner end of the notch 2, whereby the members of the shank are forced outward in a positive manner, even though the resilient or spring action of the shank members should fail or be insufficient to spread the same and cause the projection 9 to enter the depression 8. The point of the tooth overhangs or borders upon the notch or throat 3 and is adapted to be of such length as to provide for sharpening and swaging.

Having thus described the invention, what is claimed as new is:

In a saw, the combination of a blade having a pair of notches formed therein, one of the notches forming a throat while the opposite notch has an approximately tangential arrangement, the longitudinal edges of the second mentioned notch each terminating in an abutment and being parallel and of V form, the base of the notch being oppositely inclined and a depression being formed in one of the before mentioned longitudinal edges, and a detachable saw tooth comprising a shank received within the notch and shoulders engaging the before mentioned abutments, the edges of the shank having an interlocking connection with the V shape edges of the notch and the inner end of the shank being bifurcated to form spring arms, the extremity of the shank being oppositely inclined whereby the spring arms are positively forced apart when the end of the shank impinges against the oppositely inclined base of the notch, one of the spring arms carrying a projection designed to enter the before mentioned depression in one of the longitudinal edges of the notch when the tooth is inserted in position within the notch.

In testimony whereof I affix my signature in presence of two witnesses.

WILLIAM H. ASKINS. [L. S.]

Witnesses:
W. G. GARRISON,
JNO. CODELL.